(12) United States Patent
Todd

(10) Patent No.: US 11,544,253 B2
(45) Date of Patent: Jan. 3, 2023

(54) AUTOMATED DATA ROUTING IN A DATA CONFIDENCE FABRIC

(71) Applicant: EMC IP Holding Company LLC, Hopkinton, MA (US)

(72) Inventor: Stephen J. Todd, Center Conway, NH (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 80 days.

(21) Appl. No.: 16/910,451

(22) Filed: Jun. 24, 2020

(65) Prior Publication Data
US 2021/0406248 A1    Dec. 30, 2021

(51) Int. Cl.
*G06F 16/00*    (2019.01)
*G06F 16/23*    (2019.01)
*G16Y 30/00*    (2020.01)

(52) U.S. Cl.
CPC ...... *G06F 16/2379* (2019.01); *G06F 16/2365* (2019.01); *G16Y 30/00* (2020.01)

(58) Field of Classification Search
CPC ............. G06F 16/2379; G06F 16/2365; H04L 63/105; H04L 63/065; H04L 9/0891; H04L 9/0827; H04L 9/0836; H04L 9/0841; Y02D 10/00; G16Y 30/00
USPC ........................................................ 707/703
See application file for complete search history.

(56) References Cited

U.S. PATENT DOCUMENTS

| | | | | |
|---|---|---|---|---|
| 7,539,869 B1* | 5/2009 | Mullan | ................... | G06F 21/64 713/168 |
| 8,595,484 B2* | 11/2013 | Thomas | ................ | H04L 9/3265 713/157 |
| 10,757,111 B1* | 8/2020 | Marek | ................. | H04L 63/1416 |
| 10,986,076 B1* | 4/2021 | Bendickson | .......... | H04L 63/126 |
| 2005/0044356 A1* | 2/2005 | Srivastava | .......... | H04L 63/0281 713/163 |
| 2009/0144807 A1* | 6/2009 | Zheng | ................... | H04L 63/105 726/3 |
| 2010/0031027 A1* | 2/2010 | Thomas | ................ | H04L 9/3265 713/156 |
| 2014/0126573 A1* | 5/2014 | Matthews | ............... | H04L 45/00 370/389 |
| 2015/0007271 A1* | 1/2015 | Wong | ..................... | H04L 63/08 726/4 |
| 2016/0191325 A1* | 6/2016 | Pacella | ................... | H04L 45/04 370/254 |
| 2020/0233978 A1* | 7/2020 | Sofia | ..................... | H04L 9/3247 |

* cited by examiner

*Primary Examiner* — Vincent F Boccio
(74) *Attorney, Agent, or Firm* — Workman Nydegger (57) ABSTRACT

Routing data in a data confidence fabric. Data ingested into a data confidence fabric is routed to maximize confidence scores and to minimize the amount of missing confidence information. Routing is based on a configuration file and on pathing map information that allows nodes capable of applying the trust insertions set forth in the configuration file to be identified.

20 Claims, 10 Drawing Sheets

AUTOMATED DATA ROUTING IN A DATA CONFIDENCE FABRIC

FIELD OF THE INVENTION

Embodiments of the present invention generally relate to computing networks such as data confidence fabrics. More particularly, at least some embodiments of the invention relate to systems, hardware, software, computer-readable media, and methods for routing data in computing networks including data confidence fabrics.

BACKGROUND

Computing and other electronic devices come in a variety of types and form factors and have varying capabilities. Many of these devices generate data that may be used by various applications. An application, however, may or may not have confidence or trust in the data coming from those devices. Applications that have confidence in the data being used typically generate more reliable results and outputs.

A data confidence fabric (DCF) relates to systems that are able to add trust or confidence scores to data as the data is ingested into the DCF and flows within or through the DCF. Adding trust or confidence scores to the data allows the applications to have confidence in the data. However, there many issues related to the ability of the DCF to add confidence scores accurately and reliably to the ingested data.

For example, even if a node is part of a data confidence fabric, this does not guarantee that the node is able to add trust to the data that flows through the node. For example, the node may not be capable of adding trust and may not include a trust insertion technology. More specifically, the node may not be capable of performing a specific trust insertion. As a consequence, data flowing through that node may be missing trust scores or may not be adequately annotated with trust scores. This may result in a lower overall confidence score for the data.

Further, DCFs are not strictly hierarchical in their configuration. The various components or nodes of the DCF may be arranged in more of a peer-to-peer or mesh arrangement. This arrangement complicates the ability of the DCF to add confidence scores to the data. More specifically, the arrangement of nodes in a DCF allows data to follow a large number of different paths. However, the large number of paths also complicates the task of routing the data and does not ensure that data is routed to the nodes that are able to add trust or confidence scores to the data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to computing systems or ecosystems such as data confidence fabrics (DCFs). In one example, a DCF is a system or collection of hardware (computers, servers, routers, network interface cards, storage including immutable storage and/or other hardware) that is provisioned (e.g., with software, services) to score or rank data that may be ingested into the DCF. The DCF is configured to route the data such that the data ingested into the DCF can be made available to applications, which may also be part of the DCF. As the data is routed or pathed, confidence or trust scores are added to the data by the various nodes involved in the flow of the data in the DCF. The routed data is ultimately associated with a confidence score that can be leveraged by applications that use the data.

As data is routed in the DCF, the nodes may perform trust insertion or execute trust insertion technologies. Trust insertion includes, by way of example and not limitation, contributing a confidence or trust score to the data (e.g., by annotating a package including the data), performing a trust insertion technology on the data (e.g., authentication, data provenance, signatures, secure enclave computing, etc.), or the like or combination thereof.

Embodiments of the invention relate to routing data in a manner that is DCF-aware. If the nodes routing the data (or a routing engine) is aware of the capabilities of the DCF or of the capabilities of specific nodes (e.g., nodes in a subnet, nearby nodes), the data can be routed or pathed to nodes in the DCF that are capable of inserting trust that has not yet been added to the data. The data can be routed such that specific trust insertion is performed. This in part ensures that the overall trust or confidence score associated with the data is generally higher and ensures that applications can use fully developed trust or confidence scores. Stated differently, the data can benefit from all of the relevant trust insertion technologies present in the DCF or specified by an application.

More specifically, a data confidence fabric, by way of example only, may relate to an architecture and set of services that allow data to be ingested into a system for use by applications. The DCF adds trust or confidence scores to the data as the data flows through the DCF. Combining all of the confidence scores added by the nodes allows the ingested data to have an overall confidence or trust score that provides a view into the trustworthiness of the data to an application or other use. Embodiments of the invention more specifically relate to routing the data such that confidence scores, whether from hardware or software, are added to or associated with the data and ensure that missing confidence information or scores is minimized.

The data scored or ranked in the DCF may be stored in various locations, such as a data lake, in a datacenter, a distributed ledger, a Public Cloud data storage service, or the like or combination thereof. The data scored or ranked in the DCF system can be made available to one or more applications or other clients or users.

Confidence scores allow an application to explore or exploit the data for potential analysis or consumption. The score or rank of the data allows an application to understand or account for the trustworthiness of the data. For example, the confidence score of the data may have a significant impact on whether the data is actually used by the application. An application may require a minimum confidence score or have other requirements related to the confidence score.

A DCF is able to give or associate data with scores from individual trust insertion technologies that can be combined in multiple ways to determine a final score or rank that relates to the trustworthiness of the data. The scores provided from a hardware perspective can be maintained separately from confidence scores from a software perspective. The scores can also be combined into an overall score.

For example, an application operating in a nuclear facility may need to use data that is very trustworthy (have a high confidence score) while data that is used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof. This can be reflected in the confidence score. As these and other trust insertions are performed on the data, the confidence score of the data increases and an application can place more trust in the data.

Figure 1:
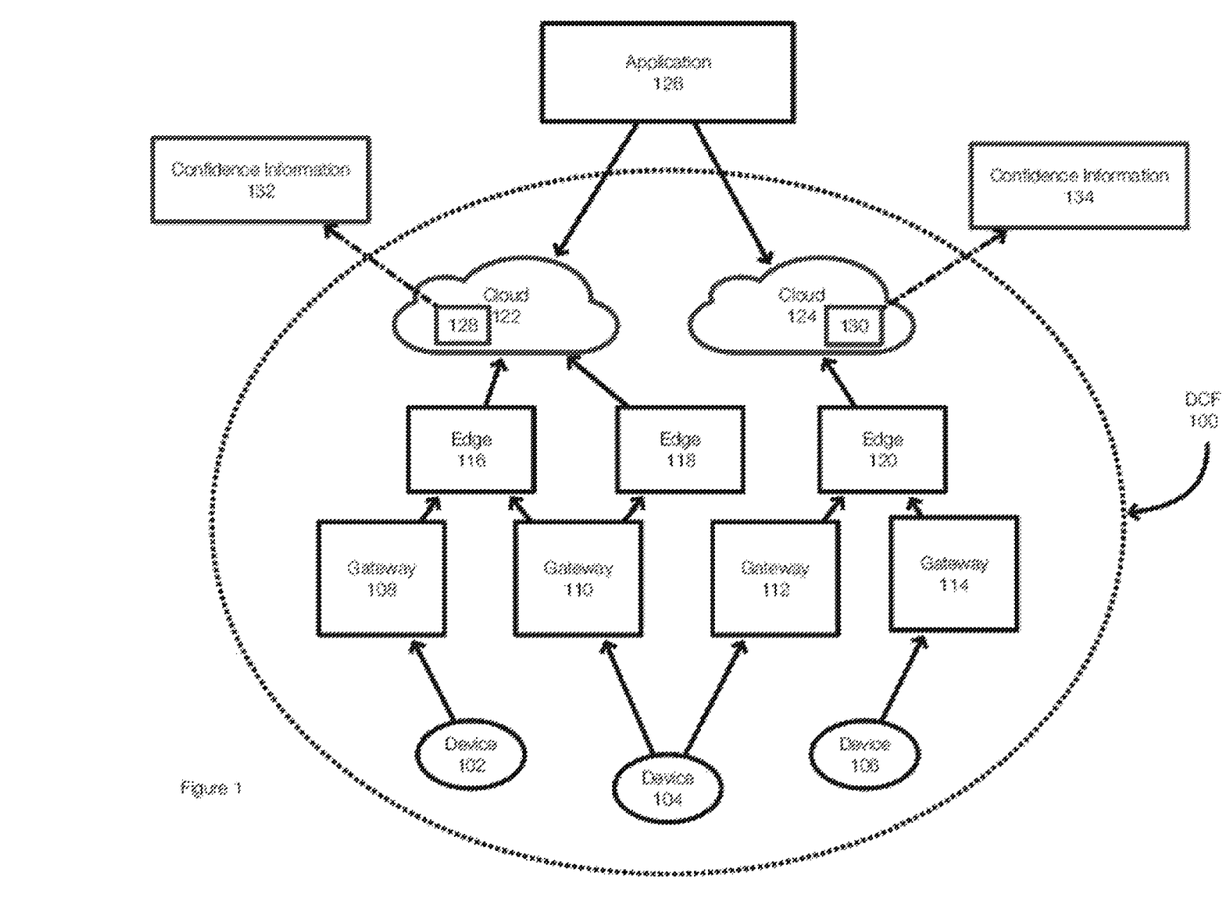
FIG. 1 discloses an example of a data confidence fabric implemented in a computing system.

FIG. 1 illustrates an example of a data confidence fabric (DCF 100). The DCF 100 includes varies computing and hardware components, connections, and environments. The DCF 100 is configured to add confidence scores to data flowing in the DCF 100. The DCF 100 may include trust insertion technologies such as, but not limited to, ledgers, immutable storage, semantic validation, authentication, data provenance, TPM (Trusted Platform Modules) signatures, or the like or combination thereof.

FIG. 1 illustrates examples of data flows or paths in the DCF 100. A specific path of specific data may be referred to as a graph or route. The paths illustrated in FIG. 1 are not the only paths available in the DCF 100. Although FIG. 1 represents the DCF 100 in a hierarchical manner, the actual configuration may not be strictly hierarchical and may include peer-to-peer and mesh configurations.

In FIG. 1, data generated by devices 102, 104, and 106 may flow through multiple levels or multiple hardware environments such as gateways 108, 110, 112, and 114, edges 116, 118, 120, and clouds 122 and 124. In one example, the data may be stored in the clouds 122 and 124.

As the data 128 and the data 130 flow through the DCF 100, the DCF 100 may add provenance and trust metadata or scoring to the data. Embodiments of the invention strengthen the confidence scores given by software by creating trusted hardware perimeters along the edges of the DCF 100 as well as within the boundaries of the DCF 100. The perimeters may include outer perimeters and/or internal perimeters.

After flowing through the DCF 100, the data 128 (which may have been generated by one of the devices 102, 104, and/or 106) is stored in the cloud 122 and made available to an application 126. Similarly, the data 130 may be made available to the application 126. The data 128 is associated with confidence information 132 and the data 130 is associated with confidence information 134. The confidence information 132 and 134 may include, by way of example only, confidence scores, provenance data, audit trails, data graphs, applied trust insertion technologies, or the like. For example, the confidence information allows data to be audited to identify the path of the data in the DCF, which nodes applied what trust insertion technologies, or the like.

Figure 2:
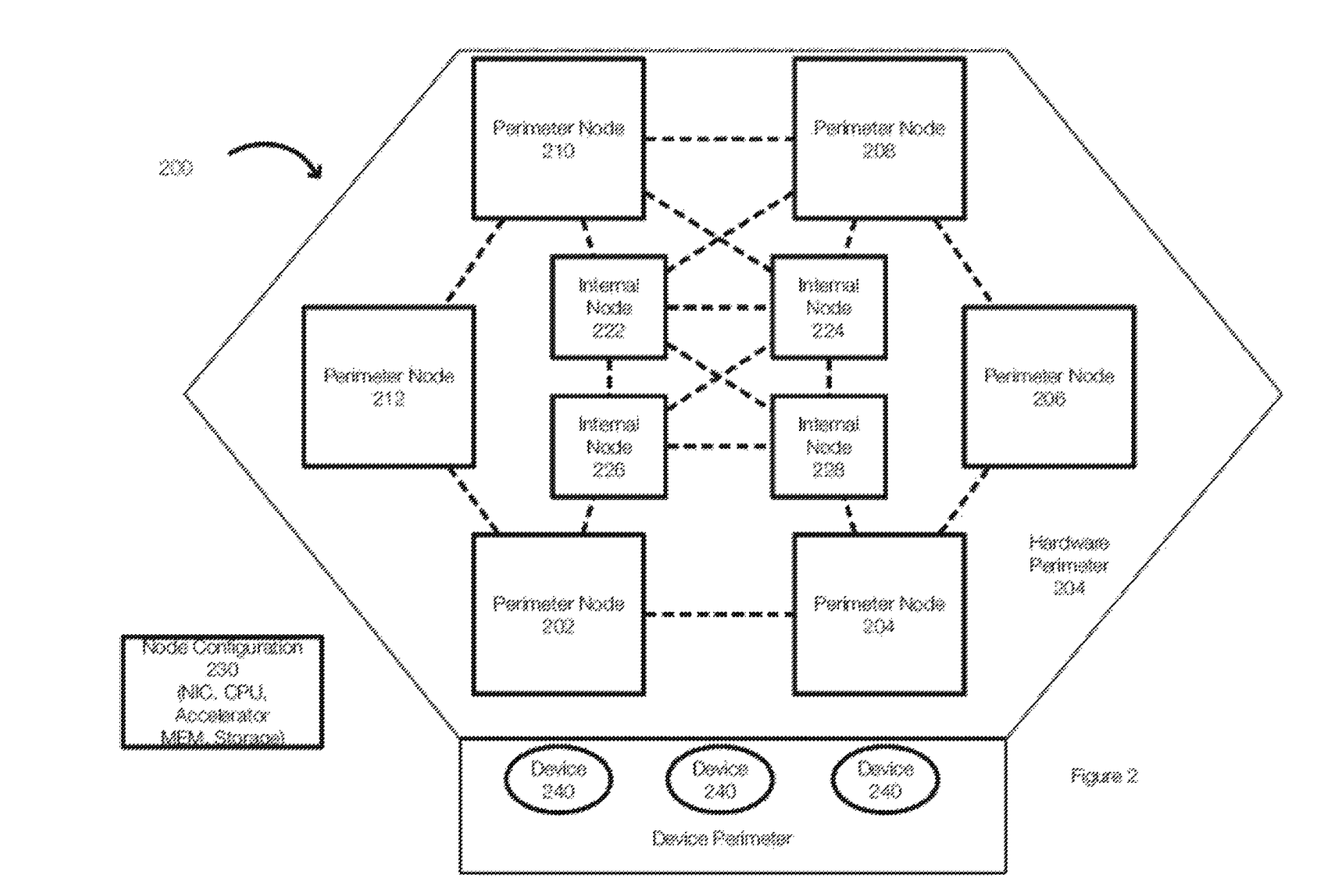
FIG. 2 illustrates another example of a data confidence fabric implemented in a computing system.

FIG. 2 illustrates another example of a DCF. The DCF 200 is illustrated by way of example only and is an example of the DCF 100. The configuration of a DCF (number of nodes, hardware characteristics of the nodes, network connections, node arrangement, or the like) can vary.

In this example, the DCF 200 includes a hardware perimeter 204 that includes perimeter nodes 202, 204, 206, 208, 210 and 212. Each of the perimeter nodes may be aware of the trust characteristics of at least some of the other perimeter nodes (or at least one other node) and are configured to work together as part of the DCF 200. The perimeter nodes 202, 204, 206, 208, 210, and 212 are configured to insert trust into data ingested from the devices 240 using trust insertion technologies. More specifically, the perimeter nodes are able to insert or associate trust or confidence scores into the data using hardware-assisted features. The perimeter nodes, however, are not limited to hardware-assisted features or trust insertion technologies.

The perimeter nodes may have different hardware characteristics. The node configuration 230 illustrates an example configuration. Thus, the perimeter nodes may include one or more of network interface cards (NICs), CPUs or processors or cores, accelerators, memory, immutable storage, secure enclaves, or the like. Thus, each of the perimeter nodes may have varying trust capabilities that can be offered to the DCF 200.

FIG. 2 further illustrates that the DCF may include internal nodes, represented by internal nodes 222, 224, 226 and 228. The perimeter/internal nodes can communicate with each other and with other devices that are not part of the DCF 200. All nodes may have the ability to communicate with devices that are not part of or that are unaware of the DCF 200

For example, the internal nodes 222, 224, 226 and 228 may form or include a protected storage layer that securely stores data in a scalable way that is protected from unauthorized access. The perimeter nodes may focus on data forwarding and/or computation and/or analytics. Some of the perimeter nodes may be adapted for data ingestion while other perimeter nodes may provide secure computing.

However, the nodes are trusted once they are added to the DCF 200 and this trust allows the nodes to be aware of other nodes, their abilities, and their trust insertion capabilities. For example, each of the nodes shown in FIG. 2 may also have or be associated with a confidence score that is distinct from the confidence score of the data. The confidence scores of the nodes may be related to their capabilities, accessibility, or the like. The confidence scores and other metadata such as capabilities may be broadcast to at least some of the other nodes in the DCF 200. Often, the broadcast may occur when the nodes joins the DCF, periodically, when an update occurs, or the like.

Figure 3:
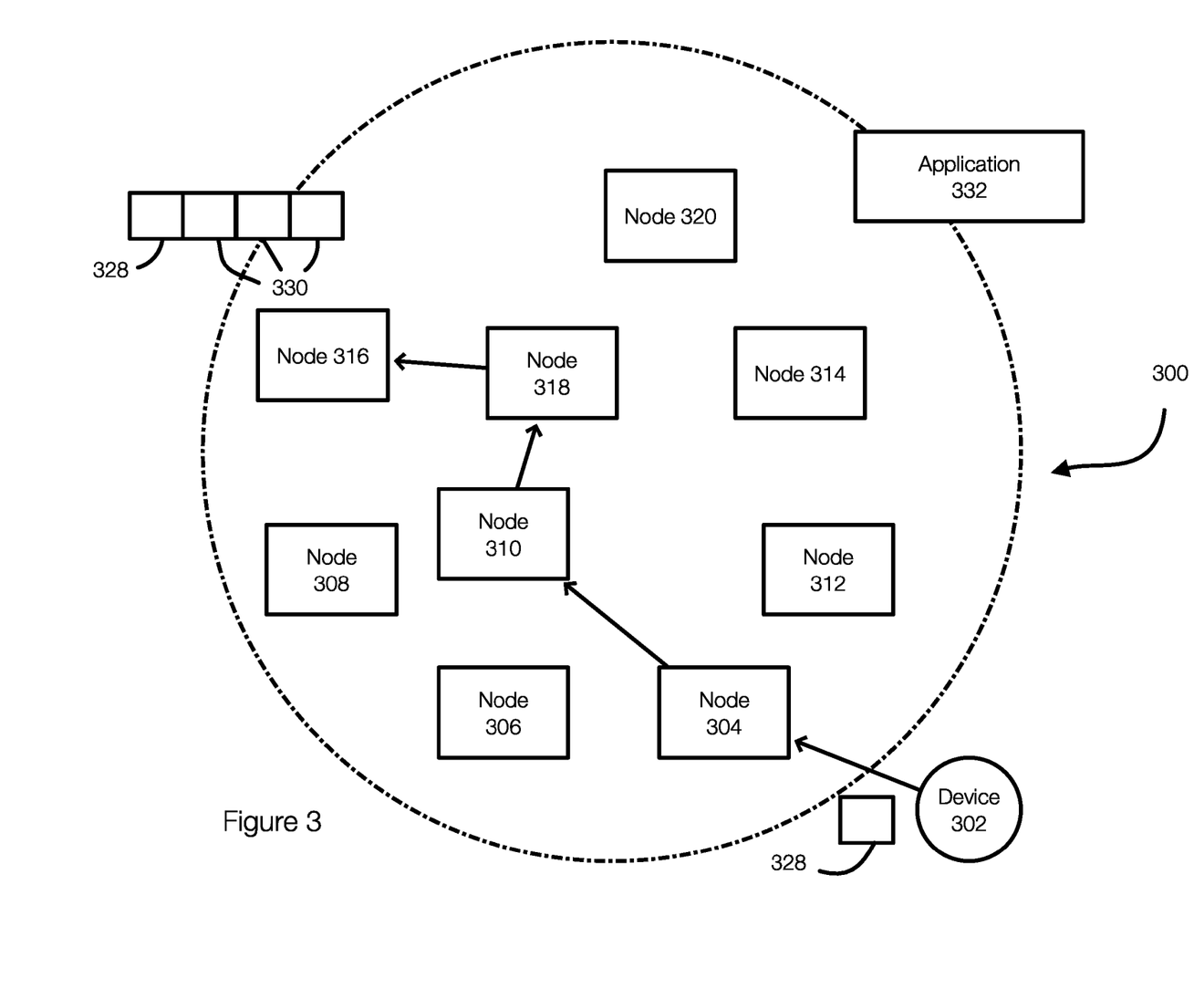
FIG. 3 illustrates an example a path in a data confidence fabric that illustrates how the data flows in the data confidence fabric.

FIG. 3 illustrates an example of a DCF 300, which is an example of the DCFs shown in FIGS. 1 and 2. The DCF 300 includes nodes 304, 306, 308, 310, 312, 314, 316, 318, and 320. The DCF 300 may ingest data 328 from a device 302. The device 302 may be a sensor, a smartphone, an IoT (Internet of Things) device, or the like. The device 302 may also be able to perform trust insertion. The data 328 ingested into the DCF 300 may be used by an application 332. More specifically, the data 328 may be used by the application 332 as long as the confidence score of the data 328 is sufficient.

FIG. 3 also illustrates a route or path of the data 328 through the DCF 300. In this example, the data 328 generated or produced by the device 302 is ingested through the node 304. The data 328 then follows a path or route that includes the node 310, the node 318, and the node 316. As the data 328 flows through the DCF 300, the data 328 is annotated with annotations 330. Each of the nodes in the path of the data 328 may have added one or more annotations. The annotations 330 may include confidence scores, may link to confidence scores in a distributed ledger, allow a confidence score to be determined, or the like. By way of example only, the annotations 330 were added, by way of example only, by the nodes 304, 310, 318, 316, and/or the device 302.

Figure 4:
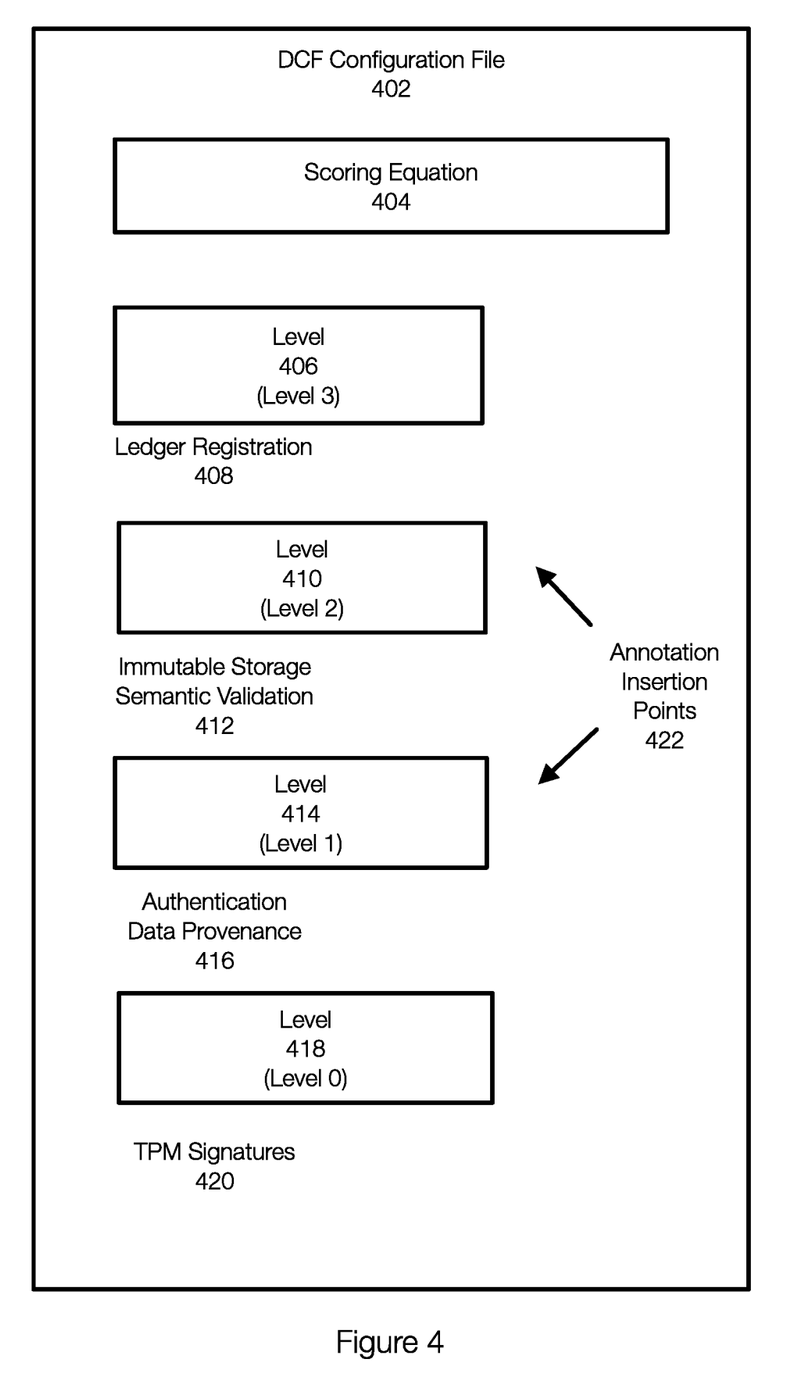
FIG. 4 illustrates an example of a configuration file associated with a data confidence fabric.

FIG. 4 illustrates an example of a configuration file 402 that may be used in a DCF. The configuration file 402 may be defined by the DCF or administrators of the DCF, may be specified by an application, or the like. More than one configuration file 402 (and which may be different) may exist in a DCF. The flow of the data in the DCF, by way of example only, may be governed or associated with a configuration file. In other words, a routing engine may use the configuration file 402 to make routing or pathing decisions. This allows a node to use the configuration file 402 to ensure that the trust insertions identified in the configuration file 402 are applied to the ingested data.

The configuration file 402 may describe the types of trust insertion that occur in the DCF or that should occur to maximize the confidence score. In this example, the configuration file 402 may be organized to include levels: levels 406, 410, 414, and 418. These levels may be hierarchical (e.g., level 3 (406), level 2 (410), level 1 (414), and level 0 (418)). These levels may also be related in other ways. In one example, the levels refer to trust insertion technologies or trust insertions that should occur in a certain order, although this is not a requirement. The configuration file 402 may also include a scoring equation 404 that allows the confidence score to be determined. The scoring equation 404 may determine how the individual confidence scores from specific trust insertion technologies are combined or may simply be a pointer into a ledger where the confidence scores (overall and/or individual scores) can be accessed.

The configuration file 402 may describe the types of trust insertion that must occur at each level in order to achieve the best confidence or trust score in the DCF. The configuration file 402 describes the types of trust insertion that should occur at each level of the DCF. By way of example, levels may be differentiated based on processing/memory/storage capabilities. Levels or nodes closer to the source of the data being ingested typically have less of these capabilities compared to levels or nodes further from the source of the data.

Each node in the DCF may have a copy of the configuration file 402 (which can be updated or changed if necessary). Each node in the DCF is also able to determine their level and attempt to execute trust insertion accordingly. The level may be determined based on available trust insertion technology. For example, a node capable of performing authentication or data provenance may identify as a level 414 (Level 1) node. This information may be broadcast to other nodes.

By routing the data as discussed herein, embodiments of the invention ensure that data is routed to nodes that have the trust insertion technologies needed to comply with the configuration file 402. Stated differently, the configuration file 402 may not include any instructions related to the data flow in the DCF or related to how the data should be transmitted. Embodiments of the invention, however, intelligently route the data to maximize the likelihood that the trust insertion technologies specified in the configuration file are applied to the data. Further, it may be useful to apply the trust insertions level by level when routing the data.

By way of example and not limitation, TPM signatures may be applied at level 418. Authentication and data provenance 416 are examples of trust insertion that may be applied at level 414. Immutable storage and semantic validation are example of trust insertion that may be applied at level 410. Ledger registration is an example of a trust insertion that may be applied at level 406. If all of these trust insertions are applied to data, the overall confidence score is likely to be higher than for data that does not receive all of these trust insertions. Embodiments of the invention thus route the data to ensure or maximize the overall confidence score based, in part, on the configuration file 402.

As previously stated, the example configuration file 402 specifies levels of annotation. These levels may correspond to a particular flow of data in the DCF. For example, a flow of a sensor to a gateway device to an edge server and to the cloud may correspond nicely to the levels in the configuration file 402. However, the configuration of the DCF and the arrangement of the nodes, which may be more mesh or peer-to-peer than hierarchical can complicate this process.

For example and with reference to FIG. 3, the node 304, after receiving data from the device 302 may transmit data to many different nodes in the DCF 300. The configuration file 402 may specify a general pattern of annotation but does not include routing or pathing recommendations in one embodiment. Embodiments of the invention relate to routing or pathing that overcome these concerns and route the data in the DCF. The node 304 may include a routing engine that allows at least the next node in the path to be identified.

Figure 5:
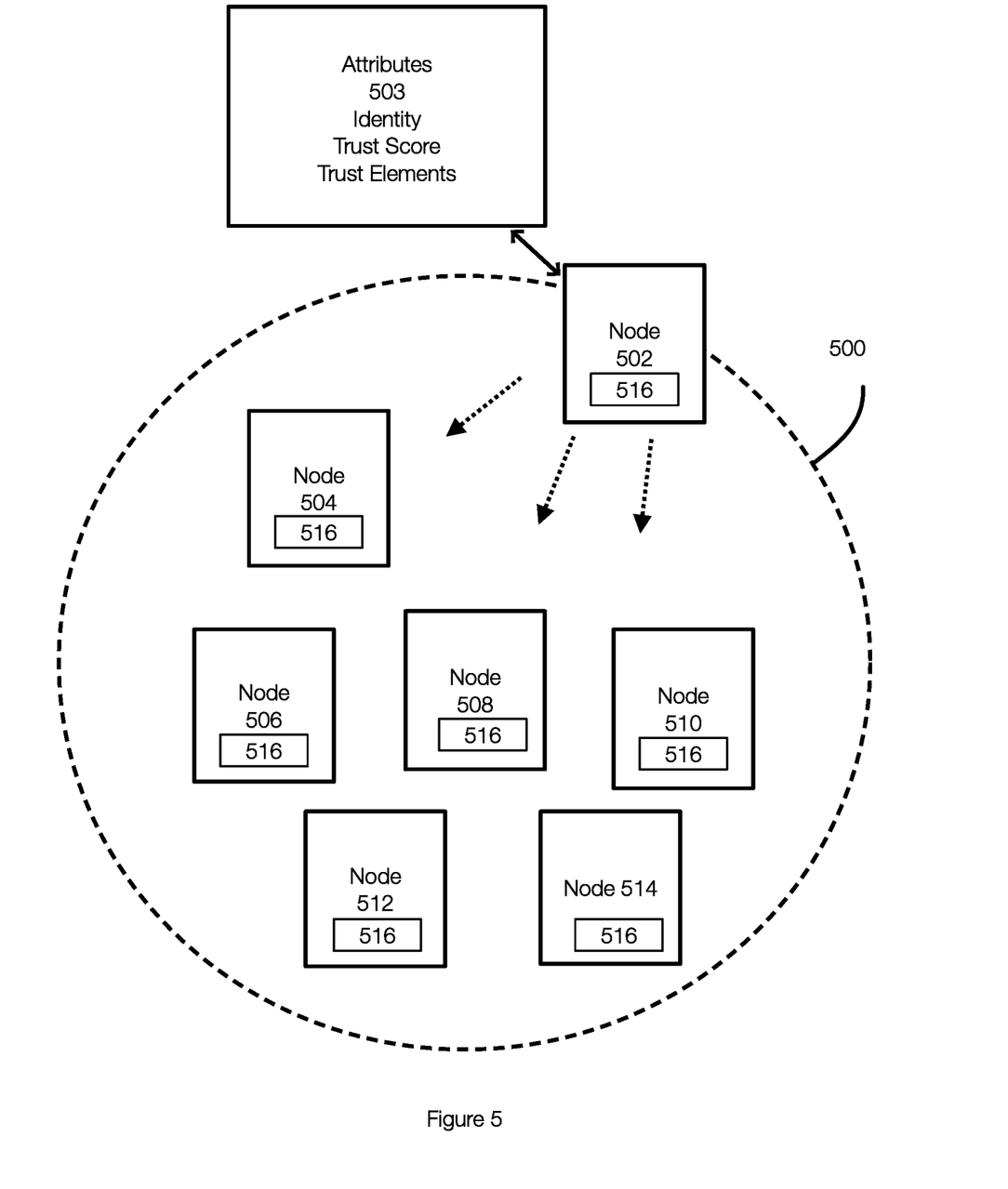
FIG. 5 illustrates another example of a node that is joining a data confidence fabric and illustrates that each node may include or have access to a routing engine.

FIG. 5 illustrates an example of a node that is joining a DCF and illustrates an example of a routing engine. The routing engine 516 may be installed, at least in part, on the nodes of the DCF. The routing engine on one node may be able to communicate with a routing engine on another engine when routing data. For example, the routing engines may communicate to determine trust insertion capabilities.

Each node, for example, may include a routing engine 516 or a portion thereof. The routing engine 516 may use, as inputs, the configuration file 402 and capability and pathing maps derived from a DCF join command. By inputting the configuration file 402 into the routing engine 516, the routing engine 516 identifies the trust insertions to be applied this allows the routing engine 516 to search for nodes that can provide the trust insertions identified in the configuration file 402.

More specifically, when the node 502 joins the DCF 500, the DCF 500 may determine whether the node 502 can join. The capabilities or trust insertion technologies of the node 502 are also determined. In this example, the node 502 includes attributes 503 that identify the node's trust insertion technologies or trust elements such as, by way of example only, secure enclave and immutable storage. The node 502 may also be assigned a trust score. The trust score of the node 502 is distinct form the trust or confidence scores with which data flowing the DCF 500 are annotated.

The node 502 may also have an identity, which relates to or identifies the DCF 500. In other words, the identity may identify a specific DCF that has been joined by the node 502.

When the node 502 joins the DCF, the surrounding nodes are informed about the capabilities or trust elements or trust insertion technologies of the node 502. For example, the node 502 may broadcast its capabilities. This information is then included in the capability and pathing maps associated with the routing engine 516. By adding this information to pathing maps, the routing engine 516 of a node can route data based on the pathing maps and the configuration file. The pathing maps allow a node to identify which node can provide the next trust insertion identified in the configuration file.

The information (e.g., the pathing maps) available or stored at each node in the DCF and used by the various routing engines 516 may differ from node to node. Thus, when the node 502 broadcasts its capabilities, the broadcast may go to some of the other nodes or to all of the nodes 504, 506, 508, 510, 512, and 516. Once these capabilities or information is available, the routing engine 516 is able to implement a dynamic and automated DCF routing system.

The routing engine 516 may identify the next node in the path in different manners. For example, the configuration file and pathing maps may be used to identify the next node in the path. The node can identify which trust insertions have been performed by comparing the annotations with the configuration file. This also allows the node to identify which trust insertion elements have been applied or which trust insertion element is next/missing. The node may then transmit the data (or package) to a node that can perform the next trust insertion by applying the requisite trust insertion technology. In another example, a node may use nearby nodes that have the needed trust insertion technology even if those nodes are not part of the DCF. In another example, a node may perform a look-ahead strategy to identify a full path in advance. The full path may be identified from the pathing maps or information and the configuration file. In another example, the selection of a path may be related to which path results in the best confidence score.

Some of the information used in routing or pathing data may already be stored at the nodes. However, a node may also be able to dynamically query other nodes for this information. This allows a node to use the most current values or information when performing routing. For example, an average ledger score may be retrieved from or determined from the ledger dynamically when routing the data or the node may store the average ledger value (and update it over time) and use the stored value for routing purposes.

Figure 6:
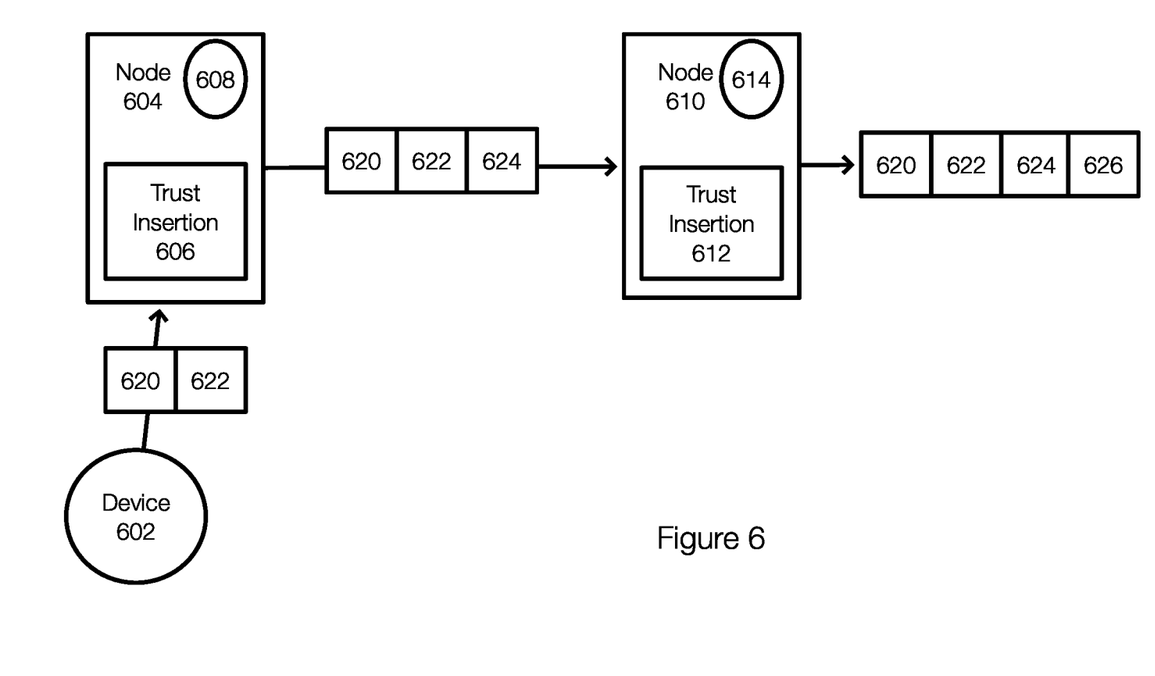
FIG. 6 illustrates an example of next action routing in a data confidence fabric.

FIG. 6 illustrates an example of routing or pathing in a DCF. In FIG. 6, the node 604 (e.g., an edge or gateway device) receives data 620 that has been annotated with an annotation 622 by the device 602. The annotation is related, by way of example only, to a TPM signature.

The node 604 includes or has access to a configuration file 608 such as the configuration file 402. According to the configuration file 608 (see the configuration file 402), the next trust insertions to be performed at level 1 (e.g., level 414), includes authentication and data provenance. In this example, the node 604 includes a trust insertion 606 that can generate provenance information or that can perform trust insertion for provenance information. The trust insertion 606, however, is not able to perform or make sure that any access to the data is properly authenticated. Thus, the node 604 is not able to add confidence scores related to authentication. As a result, the next action for the package (the data 620 and any annotations) is to find a node that can insert trust by performing an authentication trust insertion technology.

More specifically, the data 620 is annotated with an annotation 622 for a TPM signature when arriving at the node 604 and leaves the node 622 with another annotation 624 for provenance information. Before transmitting the package (data, annotations, and/or other metadata), the node 604 may perform a next action pathing and dynamically search for a node that can handle the next action, which is authentication in this example based on the configuration file 608 or 402.

In one example, the node 604 may store data related to the trust insertion capabilities of nearby nodes. For example, the node 610 may have broadcast its ability to perform trust insertion 612 (e.g., authentication) and the node 604 may store this information as pathing map information. The pathing map information may be generated at different times. For example, when a node joins a DCF, it may broadcast its capabilities to nearby nodes. In another example, the node 604 could send a query to nearby nodes to see which nodes have the ability to perform the next trust insertion based on the configuration file. The data is routed or pathed based on the next action in the configuration file. If more than one action is available in the same level, the data may be routed to any node that can provide one or more of the next actions or next trust insertions.

In one example, the pathing may also skip levels. If the node 604 cannot find any nodes that can perform the next action in the current level, the node 604 may search for nodes that can perform trust insertions in the next level. That node may resume a search for nodes that can provide a trust insertion for the previous level.

The node 604 may determine that the node 610 can provide authentication as the trust insertion 612 from its locally stored pathing map information or from a dynamic query. The packet is then routed to the node 610 and leaves the node with another annotation 626, which reflects authentication. The node 610 may also perform next action pathing by searching for a node that can provide the next action or the next trust insertion. Based on the configuration file 614 (or configuration file 402 in FIG. 4), the next action is any one of the trust insertions in the level 410—immutable storage or semantic validation. FIG. 6 illustrates that the data and associated annotations are routed based on the next action in the configuration file.

Figure 7:
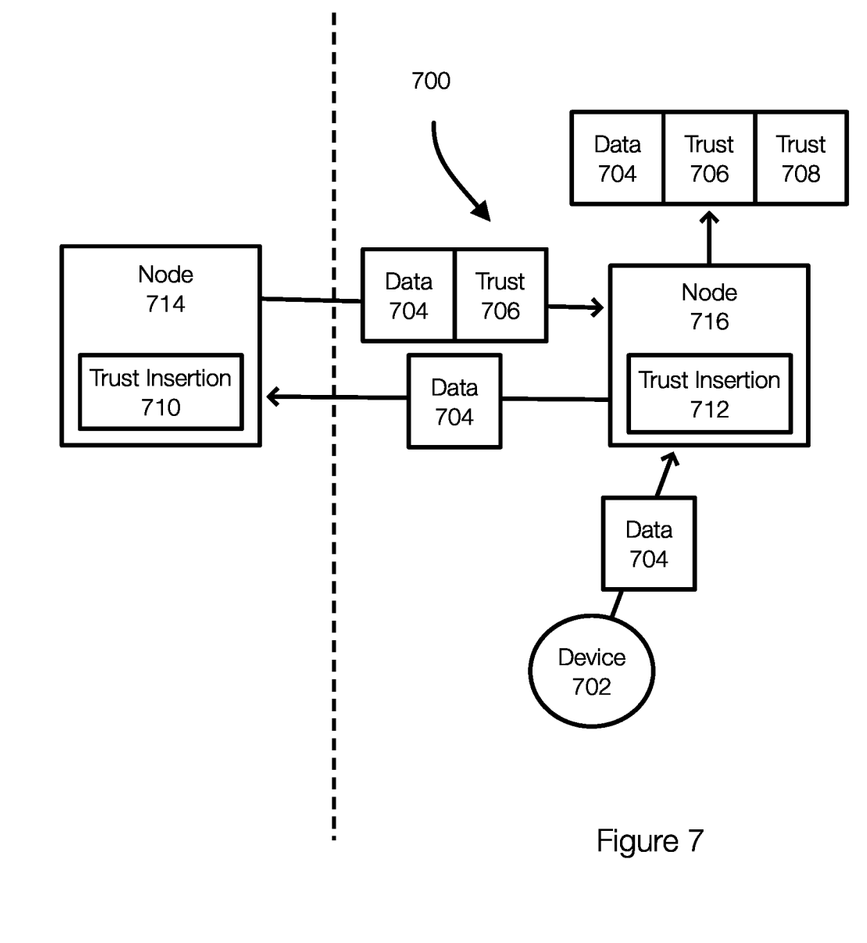
FIG. 7 illustrates an example of using nearby trust insertion capabilities when routing data in a data confidence fabric.

FIG. 7 illustrates an example of routing data using nearby trust insertion. The device 702 may generate data 704. The device 702, however, does not have the ability to provide a particular trust insertion such as a TPM signature. Further a nearby node 716 does not provide this particular trust insertion. However, the device or node 714, which may or may not be part of the DCF 700, has this ability. The device 702 can use the node 714 to perform the trust insertion 710 (TPM signature in this example). Alternatively and as illustrated in FIG. 7, the node 716 may send the data 704 to the node 714 to perform the trust insertion 710 (TPM signature). The package, which now includes the data 704 and the annotation or trust 706 is returned to the node 716.

More specifically, a configuration file associated with the DCF 700 indicates that a TPM signature should be performed on the data and that the TPM signature should be performed first. The device 702 or the node 716 can find a peer, such as the node 714, to perform this trust insertion 710. The data leaves the node 714 with the annotation or trust 706 and is sent to the node 716, which may perform a trust insertion 712 such as authentication. The package leaving the node 716 includes the data 704 and trust annotations 706 and 708. This allows the routing engine to leverage nearby trust insertion technologies even when the nodes that provide nearby trust insertion technologies are not part of the DCF 700.

Figure 8:
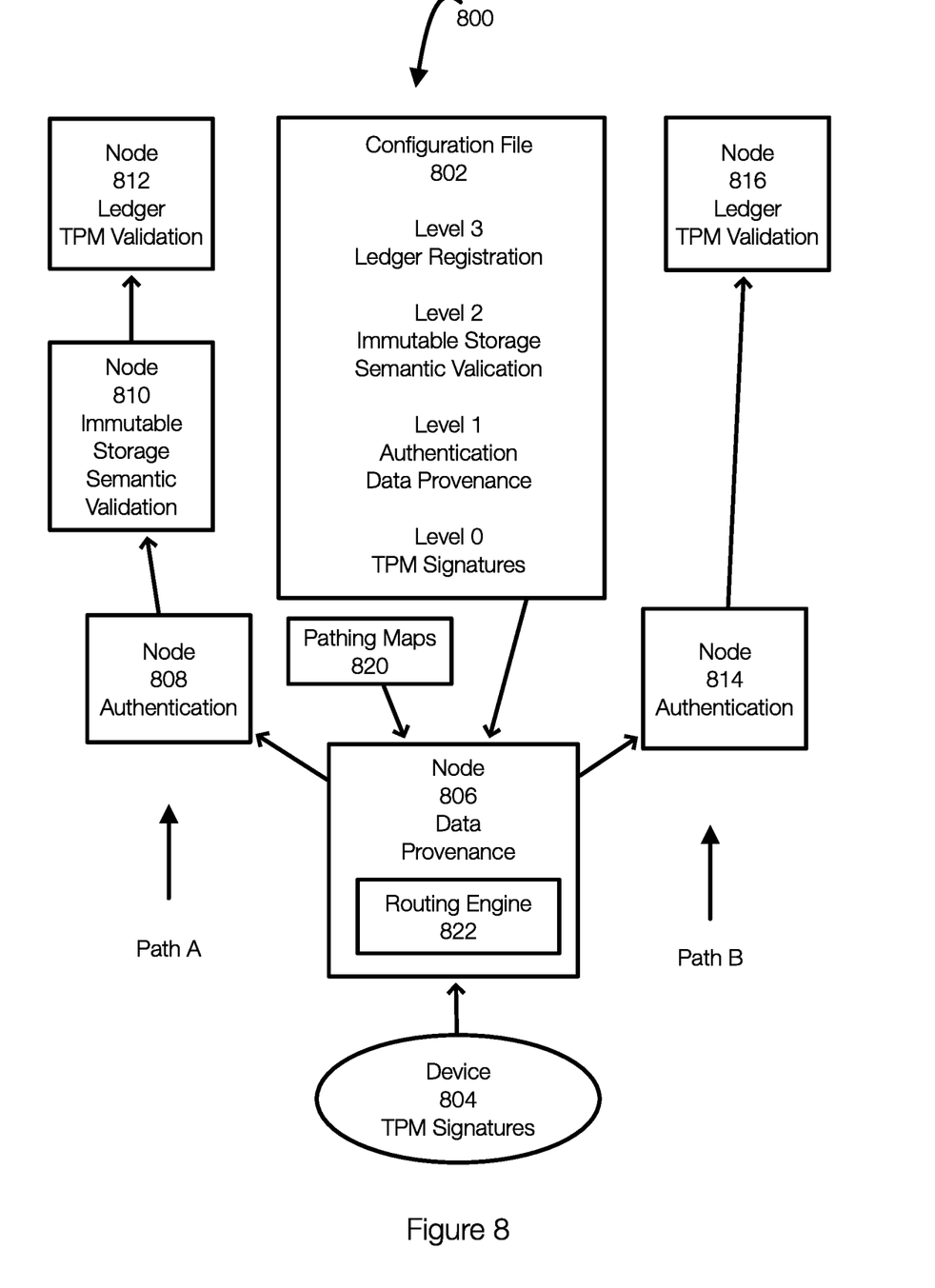
FIG. 8 illustrates an example of full path routing in a data confidence fabric.

FIG. 8 illustrates an example of full path routing in a data confidence fabric. As previously discussed, there are multiple paths that a node may choose when routing data. Next action pathing or routing sends the data to a node capable of performing a particular trust insertion. In other words, next action pathing sends the package to the next node. Embodiments of the invention further contemplate additional pathing or routing configurations.

Full path routing, as illustrated in FIG. 8, includes the ability to look ahead when making pathing decisions. Because nodes broadcast their capabilities, the pathing map information stored by a node may allow the node to identify a complete route or path for the data. The node can also compare multiple paths. This may allow the routing engine to select a path that best satisfies the conditions or trust insertions set forth in the configuration file 802. More specifically, the configuration file 802 (which may be distributed to each node in the DCF 800) may identify specific trust insertions that should be applied to data flowing in the DCF 800.

In this example, data from a device 804 has a trust insertion of TPM signatures applied prior to arriving at the node 806. The node 806 may apply data provenance as a trust insertion. The node 806, which may be the initial ingesting node of the DCF, may then perform full path routing based on the configuration file 802 and/or pathing maps stored at the node 806, and/or dynamic queries in the DCF 800.

In this example, the routing engine associated with the node 806 and/or with the DCF 800 may look beyond the next node in order find the path that best satisfies the conditions or trust insertions identified in the configuration file 802. FIG. 8 illustrates that a routing engine 822 may use pathing maps 820 and the configuration file 802 as inputs to identify paths in the DCF. This information allows the node 806, by way of example, to identify path A and path B in the DCF 800. By comparing path A to path B, the routing engine 822 determines that path B does not include level 2 trust insertions and the data would receive authentication at node 814 and ledger registration at node 816. The routing engine 822 determines that path A includes the level 2 trust insertions of immutable storage and semantic validation at the node 810 in addition to the level 1 insertion at node 808 and the level 3 trust insertion at node 812. This allows the node 806, for example, to select between path A and path B.

The node 806, by looking ahead, may recognize that the path A can satisfy all requirements in the configuration file 802. The node 806 may select path A and may include path A in the package sent to the node 808. The paths A and B can be learned over time, stored in local memory (e.g., pathing maps 820), or the like. The node 806, which may be a gateway node, may query the nodes in the DCF 800 to identify a path for the data in the DCF 800. The path may accompany the package as additional metadata. In some examples, nodes in the path may have the ability to alter the path.

Figure 9:
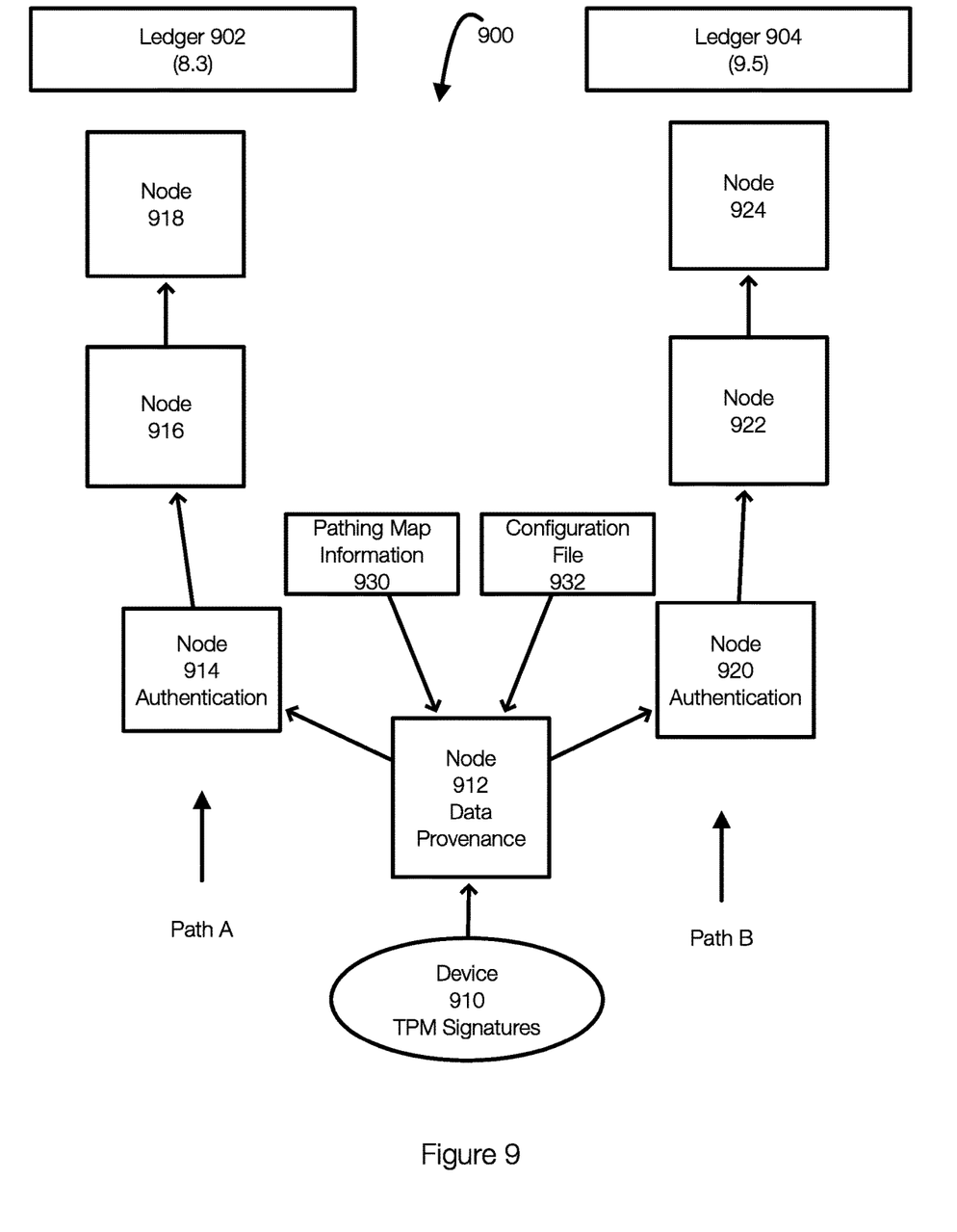
FIG. 9 illustrates an example of pathing or routing in a data confidence fabric based on overall or average confidence scores.

FIG. 9 illustrates another example of pathing in a data confidence fabric. FIG. 9 is similar to FIG. 8. However, the routing performed in FIG. 9 is based on a different consideration—ledger score or overall confidence scores. As previously stated, ledger scores such as overall confidence scores or average confidence scores may be included in the pathing map information 930. Using the pathing map information 930 and/or the configuration file 932, the node 912 can select the best path based on a representation of the confidence scores of data following these paths.

Data following path A may have an average confidence score of 8.3 while data following path B may have an average confidence score of 9.5. This information may be used to select a path by the node 912. In FIG. 9, the node 912 has received data from a device 910. The node 912 may decide between multiple paths, represented by path A and path B. In this example, the routing is determined by ledgers that store confidence scores for data processed in the DCF 900. Path B data may follow a route including nodes 920, 922 and 924. The ledger 904 associated with path B may provide an average confidence score of 9.5 (e.g., out of 10). The path A, which may include nodes 914, 916, and 918, may be associated with a ledger 902 that has an average trust or confidence score of 8.3. Path B may be selected based on the average confidence score associated with path B. The difference in average trust scores can be attributed to a variety of reasons such as available trust insertion technologies in the respective paths, node confidence scores, or the like.

Other pathing algorithms include round-robin mode where a node rotates between a set of paths, a broadcast mode where a node broadcasts data to all available routing paths, a computation-based mode where a node has visibility into application running in secure locations within the DCF and sends data to the path that ends up in these environments, or the like.

Figure 10:
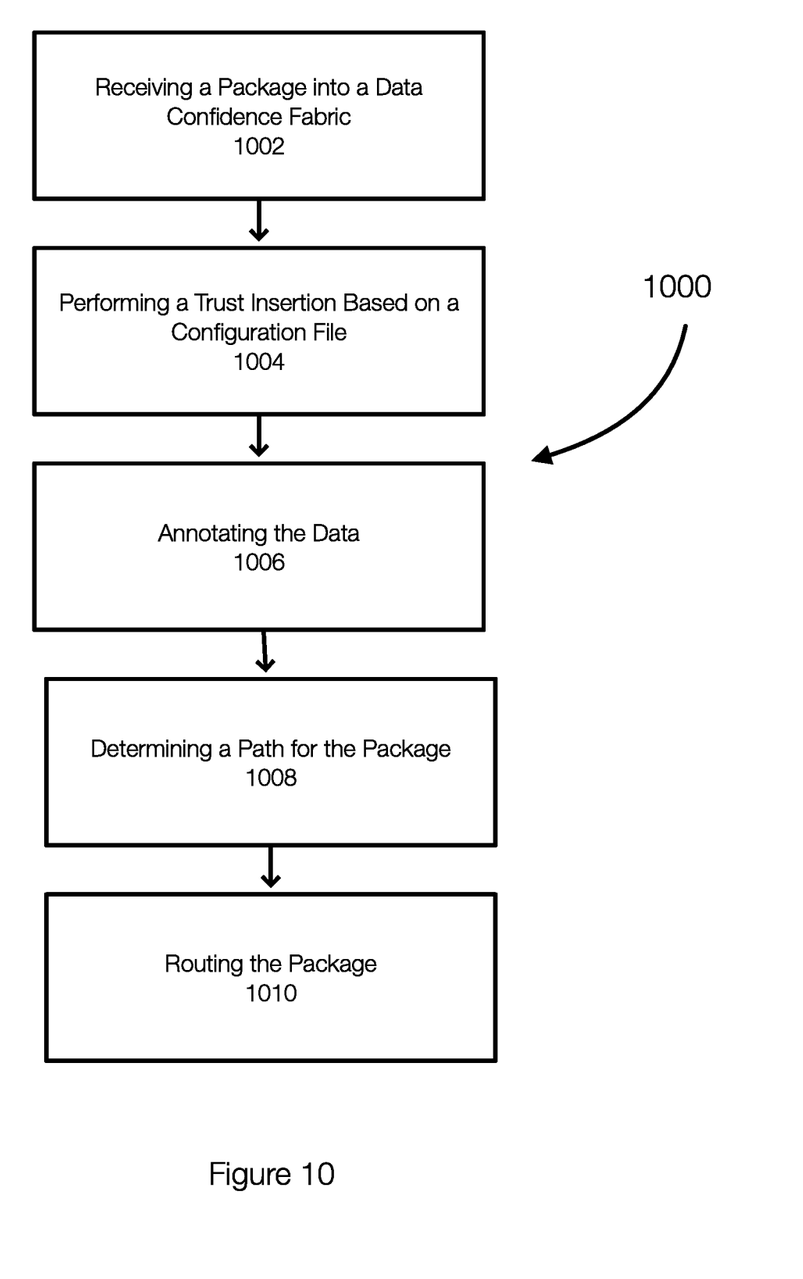
FIG. 10 is an example of a method for routing data in a data confidence fabric.

FIG. 10 illustrates an example of a method for routing data in a DCF. In the method 1000, a package (or data) is received 1002 or ingested into a data confidence fabric. Data, which may be annotated with trust information, may be received by a gateway device or a perimeter node of a DCF. The node receiving the package may perform 1004 a trust insertion on the data based on a configuration file.

After performing the trust insertion, an annotation is added 1006 to the package to reflect the trust insertion that was performed on the data. The annotation may include a confidence score, a link or pointer to a confidence score, or the like and other metadata such as specifics regarding what the trust insertion was, where the trust insertion was performed, and the like.

Next, a path is determined 1008 for the package. Determining the path includes routing or pathing operations such as next action pathing, full path routing, ledger-based routing, round robin based routing, computation based routing, or other routing or pathing determinations discussed herein or combination thereof.

Once the routing is determined, the package is routed 1010 accordingly. Based on the type of routing, a similar procedure may be performed at each node in the path. Each node, for example, may perform a trust insertion based on the configuration file, identify a next node in the path, annotate the data, and route the package to the next node in the path or to the final destination where the package or data can be consumed by an application.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data confidence fabric operations including pathing or routing operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising receiving a package at a node of a data confidence fabric, wherein the package includes at least data, performing a trust insertion on the data based on a configuration file at the node, adding an annotation to the package that is associated with the trust insertion at the node, determining a path for the package in the data confidence fabric, wherein the path determined from the configuration file, and routing the package using the path.

Embodiment 2. The method of embodiment 1, further comprising determining the path by identifying a next node in the path based on a next trust insertion identified from the configuration file and routing the package to the next node, wherein the next node is configured to perform the next trust insertion.

Embodiment 3. The method of embodiment 1 and/or 2, further comprising dynamically searching for the next node in the path.

Embodiment 4. The method of embodiment 1, 2, and/or 3, wherein dynamically searching includes searching for the next node in the pathing map information stored by the node and/or broadcasting a request to other nodes to identify the next node.

Embodiment 5. The method of embodiment 1, 2, 3, and/or 4, further comprising determining a full path for the package in the data confidence fabric by identifying the path that best satisfies trust insertions included in the configuration file, wherein the full path is determined from pathing map information and the configuration file.

Embodiment 6. The method of embodiment 1, 2, 3, 4, and/or 5, further comprising determining a path based on a ledger score, wherein a path associated with a ledger that has a best representation of a confidence score rating is selected as the path.

Embodiment 7. The method of embodiment 1, 2, 3, 4, 5, and/or 6, wherein performing a trust insertion includes leveraging a nearby node to perform the trust insertion, wherein the nearby node is not part of the data confidence fabric.

Embodiment 8. The method of embodiment 1, 2, 3, 4, 5, 6, and/or 7, further comprising determining a path based using a round robin mode, a computation-based mode, or a broadcast mode.

Embodiment 9. The method of embodiment 1, 2, 3, 4, 5, 6, 7, and/or 8, further comprising joining a new node to the data confidence fabric, wherein the new node has a confidence score and wherein capabilities of the new node are broadcast to other nodes in the data confidence fabric and stored by the other nodes in their pathing map information that receive the broadcast from the new node.

Embodiment 10. The method of embodiment 1, 2, 3, 4, 5, 6, 7, 8, and/or 9, wherein each node includes a routing engine that is configured to determine the path, wherein the routing engine uses the configuration information and pathing map information as inputs to determine the path, wherein the pathing map information includes at least associations between nodes in the data confidence fabric and their trust insertion capabilities.

Embodiment 11. The method of embodiment 1, 2, 3, 4, 5, 6, 7, 8, 9, and/or 10, wherein determining the path includes determining the path such that an order of nodes follows an order of trust insertions identified in the configuration file.

Embodiment 12. The method of embodiment 1, 2, 3, 4, 5, 6, 7, 8, 9, 10, and/or 11, wherein the order of trust insertions identified in the configuration file are arranged in levels.

Embodiment 13. The method as recited in any combination of embodiments of or portions of embodiments 1-12.

Embodiment 14. A non-transitory storage medium having stored therein instructions that are executable by one or more hardware processors to perform the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to routing and pathing operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a package at a node of a data confidence fabric, wherein the package includes at least data;
   performing a trust insertion on the data based on a configuration file at the node, wherein the configuration file identifies trust insertions that should be applied to the data, wherein the trust insertion improves a confidence score of the data, wherein the confidence score is determined by a scoring equation;
   adding an annotation to the package that is associated with the trust insertion at the node;
   determining a path for the package in the data confidence fabric such that a likelihood of the trust insertions identified in the configuration file being performed on the data is maximized, wherein the path is determined from the configuration file; and
   routing the package using the path.

2. The method of claim 1, further comprising determining the path by identifying a next node in the path based on a next trust insertion identified from the configuration file and routing the package to the next node, wherein the next node is configured to perform the next trust insertion.

3. The method of claim 2, further comprising dynamically searching for the next node in the path.

4. The method of claim 3, wherein dynamically searching includes searching for the next node in the pathing map information stored by the node and/or broadcasting a request to other nodes to identify the next node.

5. The method of claim 1, further comprising determining a full path for the package in the data confidence fabric by identifying the path that best satisfies trust insertions included in the configuration file, wherein the full path is determined from pathing map information and the configuration file.

6. The method of claim 1, further comprising determining a path based on a ledger score, wherein a path associated with a ledger that has a best representation of a confidence score rating is selected as the path.

7. The method of claim 1, wherein performing a trust insertion includes leveraging a nearby node to perform the trust insertion, wherein the nearby node is not part of the data confidence fabric.

8. The method of claim 1, further comprising determining a path based using a round robin mode, a computation-based mode, or a broadcast mode.

9. The method of claim 1, further comprising joining a new node to the data confidence fabric, wherein the new node has a confidence score and wherein capabilities of the new node are broadcast to other nodes in the data confidence fabric and stored by the other nodes in their pathing map information that receive the broadcast from the new node.

10. The method of claim 1, wherein each node includes a routing engine that is configured to determine the path, wherein the routing engine uses the configuration information and pathing map information as inputs to determine the path, wherein the pathing map information includes at least associations between nodes in the data confidence fabric and their trust insertion capabilities.

11. The method of claim 1, wherein determining the path includes determining the path such that an order of nodes follows an order of trust insertions identified in the configuration file.

12. The method of claim 11, wherein the order of trust insertions identified in the configuration file are arranged in levels.

13. A non-transitory storage medium having stored therein instructions that are executable by one or more hardware processors to perform operations comprising:
    performing a trust insertion on the data based on a configuration file at the node, wherein the configuration file identifies trust insertions that should be applied to the data, wherein the trust insertion improves a confidence score of the data, wherein the confidence score is determined by a scoring equation;
    adding an annotation to the package that is associated with the trust insertion at the node;
    determining a path for the package in the data confidence fabric such that a likelihood of the trust insertions identified in the configuration file being performed on the data is maximized, wherein the path is determined from the configuration file; and
    routing the package using the path.

14. The non-transitory storage medium of claim 13, the operations further comprising:
    determining the path by identifying a next node in the path based on a next trust insertion identified from the configuration file and routing the package to the next node, wherein the next node is configured to perform the next trust insertion; and
    dynamically searching for the next node in the path, wherein dynamically searching includes searching for the next node in the pathing map information stored by the node and/or broadcasting a request to other nodes to identify the next node.

15. The non-transitory storage medium of claim 13, the operations further comprising determining a full path for the package in the data confidence fabric by identifying the path that best satisfies trust insertions included in the configuration file, wherein the full path is determined from pathing map information and the configuration file.

16. The non-transitory storage medium of claim 13, the operations further comprising determining a path based on a ledger score, wherein a path associated with a ledger that has a best representation of a confidence score rating is selected as the path.

17. The non-transitory storage medium of claim 13, wherein performing a trust insertion includes leveraging a nearby node to perform the trust insertion, wherein the nearby node is not part of the data confidence fabric.

18. The non-transitory storage medium of claim 13, the operations further comprising joining a new node to the data confidence fabric, wherein the new node has a confidence score and wherein capabilities of the new node are broadcast to other nodes in the data confidence fabric and stored by the other nodes in their pathing map information that receive the broadcast from the new node.

19. The non-transitory storage medium of claim 13, wherein each node includes a routing engine that is configured to determine the path, wherein the routing engine uses the configuration information and pathing map information as inputs to determine the path, wherein the pathing map information includes at least associations between nodes in the data confidence fabric and their trust insertion capabilities.

20. The non-transitory storage medium of claim 13, wherein determining the path includes determining the path such that an order of nodes follows an order of trust insertions identified in the configuration file, wherein the order of trust insertions identified in the configuration file are arranged in levels.

\* \* \* \* \*